(Model.)
W. H. NICHOLSON.
EXPANDING MANDREL.
No. 255,010. Patented Mar. 14, 1882.
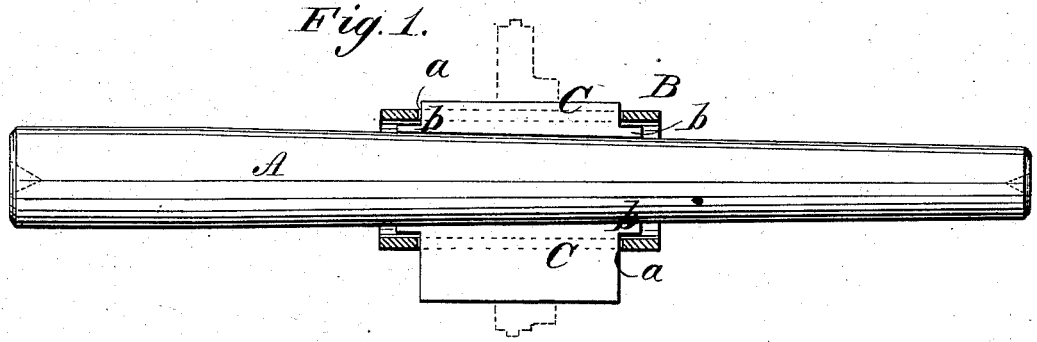
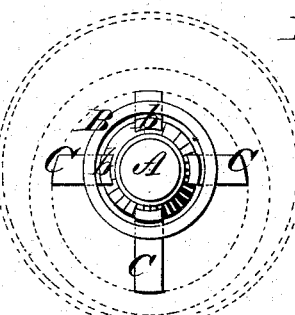 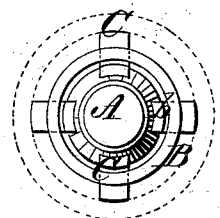
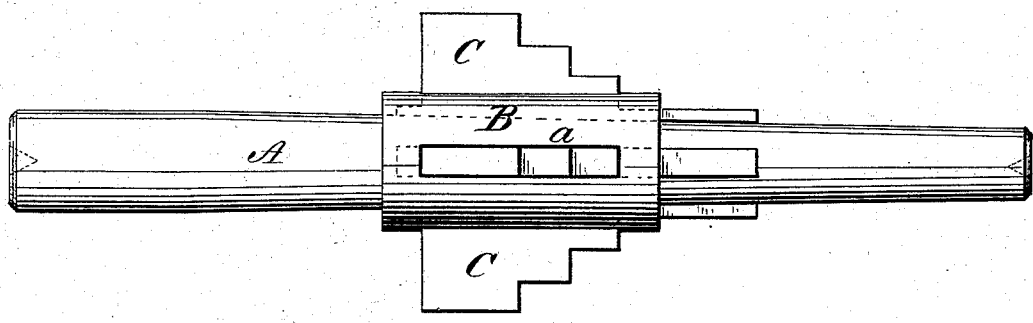
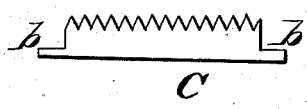
WITNESSES:
Donn Twitchell
C. Sedgwick
INVENTOR:
W. H. Nicholson
BY Munn & Co
ATTORNEYS.

UNITED STATES PATENT OFFICE.

WILLIAM H. NICHOLSON, OF WILKES-BARRÉ, PENNSYLVANIA.

EXPANDING MANDREL.

SPECIFICATION forming part of Letters Patent No. 255,010, dated March 14, 1882.

Application filed September 24, 1881. (Model.)

*To all whom it may concern:*

Be it known that I, WILLIAM H. NICHOLSON, of Wilkes-Barré, in the county of Luzerne and State of Pennsylvania, have invented a new and useful Improvement in Expanding Mandrels, of which the following is a full, clear, and exact description.

My invention is an improvement in expanding mandrels for use in manufacture of eccentrics, nuts, bands, and analogous articles.

In constructing the mandrel I employ three parts or pieces—to wit, a plain tapered or conical arbor, which is adapted to be held between the centers of a lathe, a short sleeve having lengthwise slots, and a number of segments or dogs, which are tapered on their inner edges to conform to said arbor, and have at each end an integral lug, that serves to confine the dogs in the slotted sleeve while the mandrel is being used.

In the accompanying drawings, Figure 1 is a sectional side elevation of the mandrel as fitted for holding an eccentric while being chased. Fig. 2 is an end view of the same. Fig. 3 is an end view of the mandrel as fitted for parallel work. Fig. 4 is a side view of a modification, and Fig. 5 shows a modified form of segment or dog.

A is the plain tapered arbor or mandrel proper, adapted to be held between the centers of a lathe of suitable length.

B is a straight sleeve of greater internal diameter than the external diameter of the arbor, and formed with longitudinal slots $a$.

C C are segments or dogs fitted in the slots $a$, and projected therefrom by the arbor which bears upon them. The dogs C are formed with integral lugs $b$ at their ends, the same taking beneath the sleeve B, by which their outward projection is limited. Said dogs are made of suitable width, according to the work. For an eccentric ring or band they vary in width, as shown in Figs. 1 and 2, and are applied to the sleeve B, so that the wider segment is opposite the most narrow one, the difference representing the throw of the eccentrics. For parallel work the dogs are all of equal width, as shown in Fig. 3. They may also be made of step form, as shown in Fig. 4, so that one set will accommodate pieces of work varying in diameter, and for nuts the dogs may be serrated, as shown in Fig. 5, the teeth in such case entering the thread of the nut. The dogs are tapered on their inner edges to correspond with the taper of arbor A, so that their outer edges shall be parallel to the axis of the mandrel; but for work requiring a taper finish their outer edges would necessarily be made to taper correspondingly. By forcing the tapering arbor endwise the dogs are projected so as to take frictional hold of the work, and by forcing it in the opposite direction the work is released, as will be readily understood.

To further distinguish my invention I will state that I am aware reaming-tools have been employed in which segments or teeth are held projected by a tapered arbor; but such tools differ in other essential particulars from my invention, and are not similarly adapted for the same work. And I further state that I do not claim broadly a dog or segment having end lugs formed integrally with it.

Having thus described my invention, what I claim is—

The combination of the plain conical arbor A, adapted to be held between the centers of a lathe, the short sleeve B, having longitudinal slots $a$, and the dogs C, tapered on their inner edges to conform to the taper of the arbor, and provided with integral end lugs, $b$, which extend beneath the sleeve and limit their outward projection, substantially as described.

WILLIAM H. NICHOLSON.

Witnesses:
SAMUEL THOMPSON,
GEORGE HAUSE.